Inventors.
John Reece
Franklin A. Reece
by Rogers, Kennedy & Campbell,
Attys.

Patented June 25, 1929.

1,718,578

UNITED STATES PATENT OFFICE.

JOHN REECE, OF BOSTON, AND FRANKLIN A. REECE, OF BROOKLINE, MASSACHUSETTS, ASSIGNORS TO REECE TRANSMISSION COMPANY, OF BOSTON, MASSACHUSETTS, A CORPORATION OF MAINE.

POWER TRANSMISSION.

Application filed January 20, 1926. Serial No. 82,478.

This invention relates to power transmission, and involves apparatus adapted to be used in various situations and for various purposes where varying speeds of transmission are required, for example as a part of the power transmission apparatus of motor vehicles, especially those in which the source of power is an internal combustion engine.

The general object of the invention is to afford more effective and convenient power transmission for the purposes mentioned, and more particularly to provide a mechanism wherein the speed ratio and delivered torque are self adjusting to the conditions of load or resistance; and whereby the prevailing clutch and change speed gears used on motor vehicles are dispensed with.

An instance of transmission apparatus of this class is shown in our prior Patent Number 1,551,692 of September 1, 1925. In this prior apparatus a revolving support turned by the power of the driving shaft, carries around with it a mass thrusting device or carrier, e. g. planetating, and one or more centrifugal masses loose or separate from the device, these by reason of their revolution about the main axis becoming endowed with centrifugal force, while the device operates to take each mass at an outward position and convey or thrust it bodily inwardly and release or discharge it at an inward position, from which it may return outwardly in an independent path for repetition of action; the thrusting device or carrier being actuated by connections from the driven shaft, and therefore at a rate corresponding with the difference in speeds of the driving and driven shafts; so that the centrifugal force of the masses operating as a thrusting pressure is transmitted as a self adjusting one-direction torque to the driven shaft.

Another prior instance of transmission of the class referred to, and employing centrifugal masses, is that shown in our Patent Number 1,461,557 of July 10, 1923. This shows a type distinct from Patent Number 1,551,692, the latter employing loose masses, meaning masses which are free or separate from the connections which actuate them, so that after they are drawn inwardly the masses are released or discharged and return freely outwardly without exerting pull or pressure. In the type of Patent Number 1,461,557, the masses may be described as attached, being usually solid or rigid masses, which remain connected both through the phase of inward movement and the return or outward movement, so as to exert a pull or thrust in each phase.

Each of these types of centrifugal mass transmission possesses certain advantages, and a particular object of the present invention is to afford an apparatus which maintains and combines the several advantages of both types, resulting in a transmission superior for practical purposes to either. Explaining this subject further the loose centrifugal mass type of transmission delivers thrust in one direction only, each mass being inoperative in its return or outward phase. The attached mass type on the contrary involves thrusts in opposite directions in the two phases, applying alternating torque to the driven parts, and requiring a one-way device in the nature of a pawl and ratchet as shown in Patent Number 1,461,557, allowing the driven shaft to turn in the desired direction and preventing its turning in the wrong direction; this in turn producing intermittency of drive and requiring a transmitting spring between the one-way device and the eventual driven shaft, which in turn involves the possibility of the driven shaft overrunning the spring at times, resulting in pulsating drive, which may be objectionably noticeable in the case of a vehicle. A distinct advantage however in the attached mass type is that the mass is under constant control and moves in a definite manner without internal motion, friction, impact or heating, to which objections the other type is subject. The attached mass type further is capable of delivering extremely high torque, not limited to the amount of torque delivered by the engine, but limited only by the degree of centrifugal force in the masses, which itself increases out of proportion to the engine speed, in fact as the square of the speed, thus enabling delivery of very powerful transmission at the lower ratios; which advantages are not attainable with the loose mass type. On the other hand the loose mass type draws power from the engine at all speed ratios, even when the driven shaft is held against rotation, thus tending to prevent excessive engine speed, a defect apt to occur in the attached mass type, owing to the fact that when the driven shaft is substantially stationary no appreciable power is required to whirl the masses, allowing the engine to race unless throttled to a minimum.

Other and further objects and advantages of the present invention will be elucidated in the hereinafter following description of an illustrative embodiment thereof, or will be apparent to those skilled in the subject. To the attainment of the objects and advantages referred to the present invention consists in the novel power transmission apparatus and the novel features of combination, arrangement, operation, mechanism and detail herein illustrated or described.

In the accompanying drawings Fig. 1 is a central sectional view taken on two different radii, the upper part of the figure taken on the radius 1$^a$ of Fig. 2 looking from the left, and the lower half taken on the radius 1$^b$ looking from below. The words left, right, rear and front will be used herein with respect to the use of the apparatus in a motor vehicle.

Figure 1:
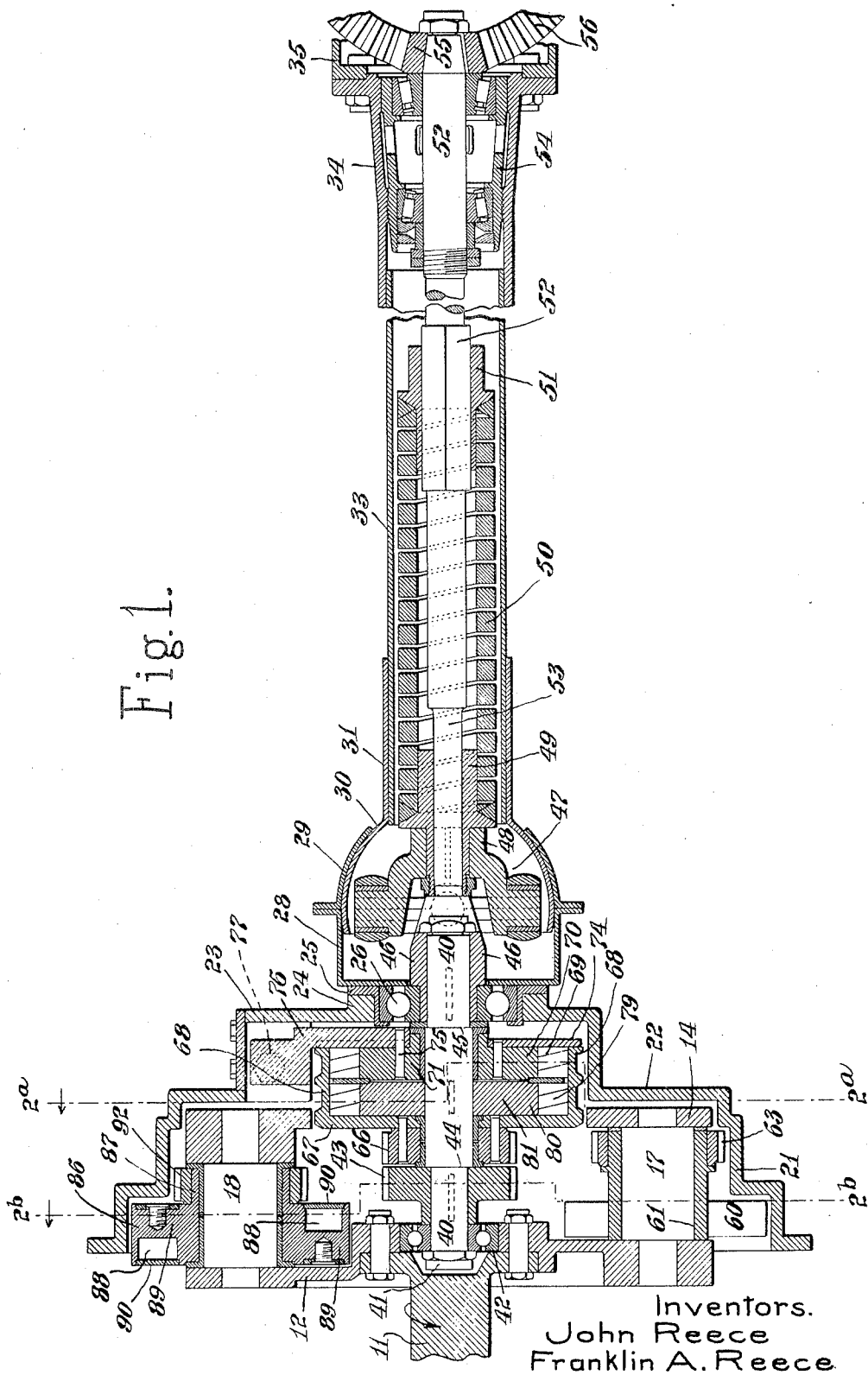

What may be termed the driving parts, continuously turned by the engine power, comprise the engine shaft 11, and a revoluble disk or support 12 turned by, and preferably carried on the engine shaft. Opposite the disk 12, and held by bolts 13, is a ring 14, and between the disk and ring are a number of pins or studs of which six are shown in the present embodiment, the two studs 17 supporting planetary means cooperating with the solid or attached masses to be described, the two studs 18 supporting planetary means cooperating with the loose or flowing masses to be described, and the two studs 19 cooperating with idler or planetary gears to be described. The described elements 11 to 19 revolve rigidly together, and having substantial weight and diameter they afford the fly wheel effect essential with the use of internal combustion engines.

The fixed or outer casing elements may next be conveniently described. The transmission casing 21 encloses the driving parts described and at its rear side extends inwardly at 22 and then rearwardly, with an enlargement at 23 to accommodate certain parts, and terminating in a fixed central hub or boss 24. A two flanged sleeve 25 is fitted in the hub 24 and supports a ball bearing 26 within which the interior parts rotate. To the rear of the described parts is shown a fixed cylindrical casing 28 having a spherical extension 29 within which the spherical extension 30 of a sleeve 31 can play, these parts enclosing a universal coupling to be described. The sleeve 31 is attached to a longitudinal tubular housing 33 enclosing the propeller spring to be described, and the rear end of the housing 33 is secured within an outer sleeve 34, the rear end of which is flanged and attached to a gear casing 35 enclosing the usual rear end gears.

The driven parts may comprise those which precede the transmitting spring and the final driven parts which follow the spring. The preceding driven parts may be termed intermediate parts and these may receive varying torque and rotation, thus maintaining the transmitting spring under strain, the final driven shaft drawing power steadily from the spring. On the other hand the transmitting spring in some cases may be dispensed with and the intermediate and final driven parts caused to turn in unison.

The drawings show an intermediate driven shaft 40 which for convenience may be termed a propeller shaft. This is preferably in alinement with the engine shaft 11, and is shown having the following features. At its front end is a nut 41 confining a ball bearing 42 and a central gear 43, the gear being keyed to the shaft and held against a shoulder 44 on the shaft. Further to the rear is a second shoulder 45 against which bears a sleeve 46, keyed to the shaft, and confined by a rear nut. The sleeve 46 may be the forward part of a universal coupling 47 in the nature of a gimbal joint, the rear sleeve 48 of which is shown connected to an interior sleeve 49 to which the propeller spring 50 is attached. This spring is shown as composed of fairly stout spring steel with a number of helical convolutions, and it may be termed a propeller spring as it stands in the place of the usual propeller shaft of a motor car. The rear terminal of the spring is attached to a sleeve 51, the interior of which is square to fit over the squared portion of the driven shaft 52, so that rotation is transmitted while longitudinal play is permitted. The driven shaft is shown as extending forwardly at 53 and passing through the sleeve 49 for purposes of alinement. The rear end of the driven shaft 52 passes through a bearing box 54 having two roller bearings, and at its rear end the shaft carries a bevel pinion 55 which may be the usual bevel pinion, meshing with a bevel gear 56 which may carry the usual differential device and thereby drive the rear wheel axles.

As already indicated this invention involves, in combination, cooperating centrifugal mass transmission devices of two types, heretofore referred to as the attached mass type and the loose mass type respectively. One or both of these types may be employed in a plurality of units, and herein are shown two units or devices of each type. Referring first to the attached masses 60, these may consist of segments of iron or steel attached to or formed with a sleeve 61 turning loosely on the studs 17. By this simple fitting each mass may move inwardly and outwardly in a planetary path. A gear 63 is shown attached to each sleeve 61, and through each of these gears the mass is connected to be actuated from an intermediate or driven part. It is preferred that the planetation be in a direction the opposite of the general revolution of the driving parts, and to this end each planet gear 63 is driven by an idler gear 64 having its hub 65 mounted on a stud 19, the idler gear engaging a central gear 66. Looking at Fig. 2 and assuming the driving parts to turn counterclockwise as indicated, the gears 63 and masses 60 will planetate in a clockwise direction; which will be true also of the other planetary transmitting devices later to be described. The central gear 66 is shown arranged alongside the central gear 43. The latter is keyed directly to the shaft 40 but the gear 66 instead is connected to a disk 67 having a rim 68 which forms the outer wedging element of both of the one-way devices to be described. The first of the one-way devices comprises the rim 68, and rolling inside the rim a series of wedging rollers or friction pawls 69. Each of the wedging rollers 69 bears against a wedging abutment 70, which presents an inclined surface by which the roller may be forcibly wedged against the rim to prevent rotation in a clockwise direction. The several abutments 70 are formed at the periphery of an abutment disk 71, which carries a series of light springs 72 arranged to press the rollers always into wedging position. The purpose of the one-way device 68—70 is to prevent the rim 68 and therefore the central gear 66 turning clockwise, but allowing them to turn counterclockwise or forwardly, so that the alternating thrusts of the attached masses 60 will, in their inward phase, advance these parts, but in their outward phase meet the resistance of the one-way device, this effecting a control over the outward movement of the masses and bringing them smoothly to position for repetition of action. To secure this operation it is necessary to anchor the abutment disk 71, by which is meant holding it substantially stationary, although a slow or small movement would be permissible if not interfering with the transmitting operation. For anchoring the abutment disk 71 there is shown a fixed disk 74, which also positions and confines the wedging rollers in place. Pins 75 connect the abutment disk 71 to the stationary disk 74, and the latter is formed with an anchoring arm 76, having a bolt or other means 77 anchoring it against substantial motion.

The central gear 66, thrust alternately by the masses 60, the one-way device, and the shaft 40, may be variously combined to secure the transmission to the shaft of the alternate thrusts. Herein a particular embodiment is shown in which the gear 66 is attached to one of the elements, the rim element, of the one-way device, the other element of which is anchored, so that the impulses are transmitted intermittently to the rim element as step by step advance movements, while said rim element is arranged to transmit the forward impulses to the shaft 40 during the inward phase of the masses, without holding or restraining the shaft against continued advance movement during the other or return phase. This may be done by employing a second one-way device in the nature of a pawl and ratchet, operating in the reverse direction. Thus a second set of wedging rollers 79 is shown, arranged between the rim 68 and a series of wedging abutments 80 inclined oppositely to the abutments 70. The abutments 80 are formed around an abutment disk 81 carrying spring 82 pressing the rollers to their seats. The abutment disk 80 is shown keyed to the shaft 40. By the arrangement thus far described the shaft 40 will be advanced intermittently during the inward phases of the masses 60, but during the other phases it will be free, owing to the second one-way device, to be advanced by other means.

During normal transmission of course the propeller spring 50 will be under continuous strain resisting all advance of the shaft 40. During one phase the masses 60 overcome the torque of the spring and turn the shaft, thus winding the spring tighter, and it is the plan hereof to advance the shaft 40 during the other phase, namely by other transmitting means, which in the particular case illustrated comprises centrifugal mass transmitting means of the loose mass type.

The loose mass transmitting means is shown as comprising two separate units or devices, mounted on the studs 18. Each loose mass 85 may be of various types but is preferably a flowing mass such as mercury or other liquid, or preferably a combination of mercury and heavy sand. Each mass, or a plurality of masses, may cooperate with a carrier 86, by which is meant any mechanical thrusting means, preferably planetary, mounted on the driving member, and arranged to thrust each loose mass from outward to inward position and there release it to return freely outward for repetition of action. For illustration the construction is shown as much similar to our prior Patent Number 1,551,692. Each of the two carriers has a hub 87 turning loosely on the stud 18. The carrier is a rotary device having a plurality of guides or channels 88 for the respective masses 85. Two annular channels 88 are indicated, each having an abutment or thrusting member 89 by which the masses may be thrust inwardly against their centrifugal force, and the two abutments being spaced oppositely so as to act successively, thus giving overlapping transmitting actions and consequent continuous one-way drive. Each channel 88 is shown covered and hermetically sealed by a ring 90 fastened tightly in place.

The connections from the shaft 40 for causing the planetation of the carriers 86, constituting also the connections by which the centrifugal force of the masses is transmitted to the shaft, may comprise a planet gear 92 on the carrier hub 87, the same meshing with an idler or planet gear 93 having a hub 94 loosely surrounding the hub 65 of the idler gear 64 and turning about the stud 19. The idler gear 93 in turn meshes with the central gear 43 which is keyed to the shaft 40.

Figure 2:
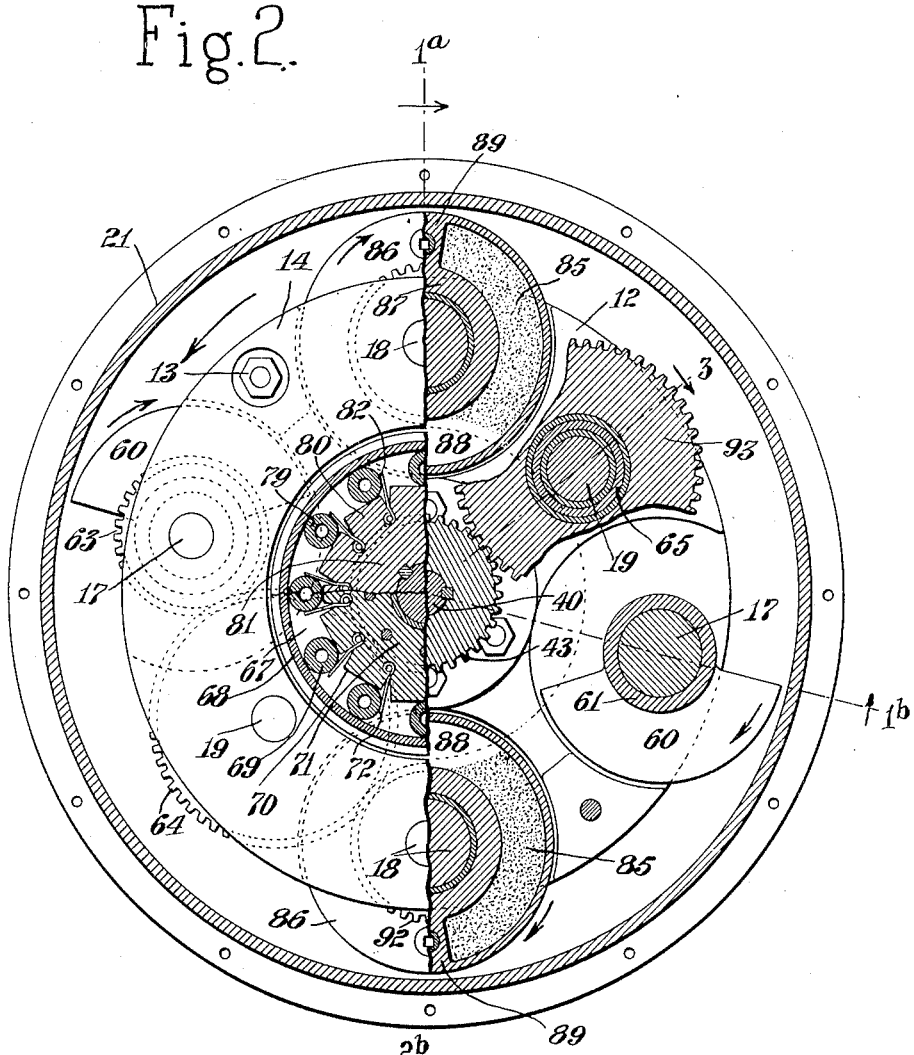
Fig. 2 is a transverse section taken partly on the line 2$^a$—2$^a$ of Fig. 1 and partly on the line 2$^b$—2$^b$, looking from the rear.
Figure 3:
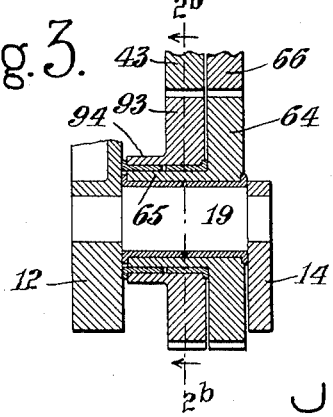
Fig. 3 is a detail sectional view taken on the line 3—3 of Fig. 2.

In operation this flowing mass transmitting device gives continuous torque transmission for the reason that each body of mass 85 is operative for more than half a planetary turn, the two overlapping. In Fig. 2 each abutment 89 is shown as having already forced its mass inwardly nearly 90°, during which entire motion the centrifugal force of the mass has been directly opposed to the planetating motion, and thereby transmitted through the gears to the shaft 40, tending powerfully to rotate the shaft in the same direction as the engine shaft. The release or discharge of the flowing mass from the abutment is not sudden but is progressive. Thus it will be seen that the extreme forward particles of mass are near to the inner dead center position and shortly will be released at the opposite side and allowed to slide outwardly around the annular path or channel. Other portions of mass will follow until, when the abutment reaches the inward dead center, all of the mass will have been released and will stand in outward position in readiness to meet and resist the succeeding movement of the abutment.

In cooperation with the attached mass devices the loose mass devices afford an advantageous and effective drive, especially when using two one-way devices in series or succession between the attached mass devices and the shaft. Thus during the inward phase of the attached mass device it is delivering powerful torque to the shaft 40, and this torque is enhanced by the torque delivered directly to the shaft by the loose mass device. The former acts through the gear 66 and the second one-way device, and the latter acts through the gear 43 directly to the shaft. In the second or outward phase of the attached masses they can not deliver torque to the shaft in the wrong direction because the first one-way device holds the rim 68 against reverse rotation. This however does not lock the shaft, which on the contrary is free to advance despite the stationary condition of the rim member, namely through the presence of the second one-way device; and during this phase the loose or flowing mass transmissions operate through the gear 43 to keep the shaft in rotation. By this combined arrangement the propeller spring 50 is consequently driven at its forward end, and the eventual driven shaft therefore can never overrun the spring or shaft 40. The spring remains always under strain in a counterclockwise direction, and the final driven shaft is able to derive continuous torque from the spring, notwithstanding variations in torque applied at the front end of the spring to maintain it under strain.

It will thus be seen that there has been described a power transmission apparatus embodying the principles and attaining the advantages of the present invention; and since many matters of combination, arrangement, operation, mechanism and detail may be variously modified without departing from the principles, it is not intended to limit the invention to such matters except so far as set forth in the appended claims.

What is claimed is:

1. Power transmission apparatus comprising the rotary driving member, a revoluble support turned by the driving member, and a rotary propeller member, in combination with a plurality of transmitting means between the driving and propeller members, one consisting of a mass arranged on said support to be revolved bodily while movable inwardly and outwardly, and connections from the propeller member to the mass for alternately compelling the mass to move inwardly and allowing it to return outwardly, and the other consisting of a movable device on the support and a loose mass cooperating therewith, the device adapted to thrust the mass inwardly and release it to return outwardly, and connections from the propeller member to the movable device for actuating it, and a one-way device preventing the propeller shaft rotating in the wrong direction.

2. Power transmission apparatus comprising the rotary driving member, a revoluble support turned by the driving member, a rotary propeller member, a transmitting spring, and a driven member, in combination with a plurality of transmitting means between the driving and driven members, one consisting of a planetary device on the support and a mass attached in unbalanced position on said device, and connections from the propeller member to the device for planetating the device and mass, and the other consisting of a movable device on the support and a loose mass co-operating therewith, the device adapted to thrust the mass inwardly and release it to return outwardly, and connections between the driven member and the planetary device for actuating the device, and a one-way device preventing the propeller shaft rotating in the wrong direction.

3. Apparatus as in claim 1 and wherein the first transmitting means comprises a mass attached to a planetary carrier, and the actuating connections arranged to rotate the carrier in a direction the opposite to that of the revoluble support.

4. Apparatus as in claim 1 and wherein the second transmitting device comprises a mass guided annularly, with a movable device arranged to thrust the mass inwardly in said path in a direction the opposite of that of the revoluble support, and release it to return freely outward.

5. Apparatus as in claim 1 and wherein the one-way device is associated with a second one-way device permitting the propeller member to be turned forwardly during the outward movement of the first mass.

6. Power transmission apparatus comprising the rotary driving and driven members, a transmitting means comprising a mass revolved bodily by the driving member, while movable inwardly and outwardly, and connections from the driven member for so moving the mass, said connections including a rotary part pressed in alternate directions by the centrifugal force of the mass, a one-way device preventing said part rotating except in one direction, a second one-way device, between the rotary part and driven member permitting the driven member to be rotated in said direction when the rotary part is stationary, and means for rotating the driven member when the rotary part is stationary.

7. Power transmission apparatus comprising rotary driving and driven members, a stationary part and a rotary part, transmitting means between the driving member and rotary part comprising a centrifugal mass effecting thrusts on the rotary part in alternate directions, a one-way device between the rotary part and the stationary part, permitting the rotary part to rotate only in a given direction, and a one-way device between the rotary part and driven member whereby the part may transmit torque to the driven member in said direction, but permitting the driven member to be advanced therefrom, and means between the driving and driven members for advancing the latter when not advanced through said part.

8. Power transmission apparatus as in claim 7 and wherein the last named means comprises a continuously acting transmitting means.

9. Apparatus as in claim 1 and wherein the loose mass thrust and released by the second transmitting means consists of a combination or mixture of heavy sand and mercury.

10. Power transmission apparatus comprising a driving member, a planet carrier thereon, and a centrifugal mass associated therewith, comprising finely divided solid material combined with mercury.

In testimony whereof, we have affixed our signatures hereto.

JOHN REECE.
FRANKLIN A. REECE.